United States Patent [19]
Wells

[11] 3,877,185
[45] Apr. 15, 1975

[54] ABRADING TOOL

[76] Inventor: Edmund F. Wells, R.D. No. 2, Box 113, Fox Hollow Rd., Hoosick Falls, N.Y. 12090

[22] Filed: June 3, 1974

[21] Appl. No.: 476,120

[52] U.S. Cl. .................................................. 51/358
[51] Int. Cl. ............................................ B24d 17/00
[58] Field of Search ........................... 51/358–364, 51/370

[56] References Cited
UNITED STATES PATENTS

| | | | |
|---|---|---|---|
| 1,120,023 | 12/1914 | Cangen | 51/360 |
| 2,749,680 | 6/1956 | St. Palley | 51/364 |
| 3,380,202 | 4/1968 | Hartinger | 51/364 |
| 3,774,354 | 11/1973 | Taylor | 51/358 |

*Primary Examiner*—Othell M. Simpson
*Attorney, Agent, or Firm*—Pollock, Philpitt & Vande Sande

[57] ABSTRACT

Abrading tools for use in cleaning or preparing inside diameters of bores in a base material or the outside diameters of the ends of rounded pipe or bar stock comprise a body portion adapted for high speed or manual rotation about an axis; a plurality of spaced, resilient arcuate wall portions upstanding from the body and defining a bore centrally thereof; and a strip of abrasive sheet threaded among the spaced wall portions around the bore.

7 Claims, 6 Drawing Figures

PATENTED APR 15 1975 3,877,185

ABRADING TOOL

BACKGROUND OF THE INVENTION

Frequently in the manufacture of various machine products and components, it is necessary to clean or ream the inside diameter or a bore located in a base structure or to similarly clean or reduce the outside diameter of a piece of bar stock or pipe. For example, it is sometimes necessary to slightly enlarge the diameter of a bore in order to provide proper fit to a mating part. Similarly, one may need to reduce the outside diameter of a pipe in order to provide proper fit in a braze joint. Very often, such operations are performed using handheld tools; however, as in the case of the cylinder bores of an internal combustion engine, it is generally desirable to use a rigidly mounted tool for reaming operations.

The prior art discloses a variety of devices for preparing or cleaning the inside and outside diameters of bores and pipes as discussed above. Such devices include simple grinding wheels which may be used for interior and exterior preparation, wire brushes which are similarly used and centrifugally actuated grinding or polishing stone mechanisms which are particularly useful for reaming bore diameters. A common problem encountered with many prior art devices is the failure of the abrading tool to maintain concentricity of the prepared surface with the remainder of the bore or outside surface of the work piece.

An object of this invention is to provide an abrading tool which may be used for cleaning or reducing the inside or outside diameters of bores or round work pieces while maintaining concentricity of the cleaned or prepared surface with the center of the work piece prior to cleaning or reaming.

Another object of this invention is to provide an abrading tool which is adapted for cleaning or preparing either cylindrical or tapered work pieces.

Another object of this invention is to provide an abrading tool which may be used manually or power driven by means such as an electric drill or the like.

SUMMARY OF THE INVENTION

In keeping with the above objects, an abrading tool according to this invention comprises means such as a shank suitable for insertion in a standard quarter-inch drive drill for imparting a high speed rotating motion to the abrading tool or for attachment to a handle for manually applied rotating motion. Attached to the shank is a body portion of enlarged diameter having a surface oriented transverse to the axis of rotation of the shank, on which are located a plurality of upstanding arcuate wall portions which define a bore concentric with the axis of rotation of the shank, the wall portions being spaced each from the other around the bore. Finally, at least one strip of abrasive sheet materials such as emery cloth or fine sandpaper is threaded among the spaced wall portions around the bore to define an essentially cylindrical abrading surface.

BRIEF DESCRIPTION OF THE PREFERRED EMBODIMENT

Figure 1:
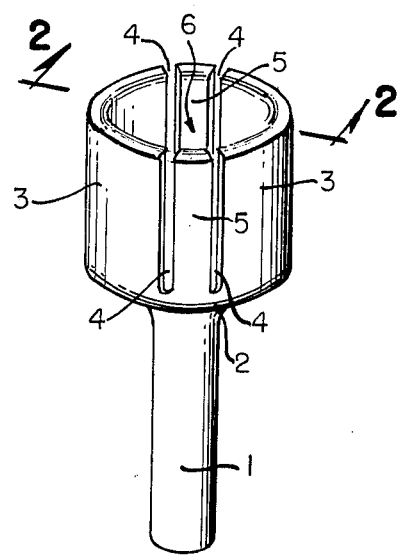
FIG. 1 shows a perspective view of one embodiment of the invention.

There follows a detailed description of preferred embodiments of the invention, reference being made to the enclosed drawings on which like reference numerals identify like elements of structure in each of the several Figures.

FIG. 1 shows a perspective view of a first embodiment of the invention. An essentially cylindrical shaft 1, which may be sized to fit a conventional quarter-inch drill, expands, within approximately one-half inch, at one end thereof to form an integral, outwardly flaring body portion 2 of approximately ⅞ inch diameter. On an upper portion of the body portion 2 are located upstanding, approximately semicircular wall portions 3 and upstanding arcuate wall portions 5, separated by radial, abrasive sheet retaining slots 4. In one actual example of the invention, the upstanding approximately semicircular wall portions 3 extend through arcs of approximately 155° and are approximately ⅝ inch high, relative to the top surface 7 of the flaring body portion 2. (See FIG. 2) The upstanding arcuate wall portions 5 extend through arcs of approximately 16.5° or about one-eighth of an inch on the outside diameter of flaring body portion 2 and are also ⅝ inch high. The radial, abrasive sheet retaining slots 4 extend through an arc of approximately 4° or one thirty-second inch on the outside diameter of body portion 2 and are also ⅝ inch deep. A central bore 6 is defined by the upstanding wall portions and may be approximately 0.625 inches wide and ⅝ inch deep. It should be noted that these dimensions are by example only and that larger or smaller tools may be made without departing from the spirit of this invention.

Figure 2:
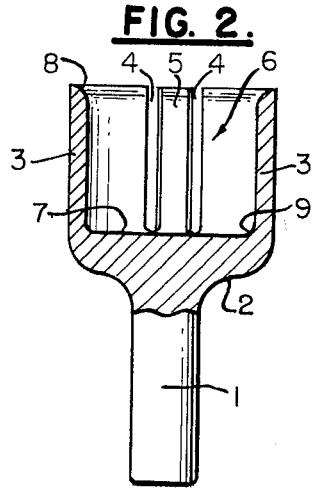
FIG. 2 shows a section of the invention taken along line 2—2 of FIG. 1.

Turning now to FIG. 2, the interior geometry of bore 6 may be understood. Central bore 6 terminates in an essentially flat bottom surface 7 which is essentially coplanar with the lower ends of wall portions 3 and 5 and the bottom of retaining slots 4. The lead-in surfaces of the upstanding wall portions are radiused as shown at numeral 8 to facilitate insertion of a work piece within bore 6. Similarly, the corner formed at the joint between the upstanding wall portions and the flat bottom surface 7 is rounded as indicated at 9 to reduce stress concentration in that area due to flexure of the upstanding wall portions during use of the invention.

Figure 3:
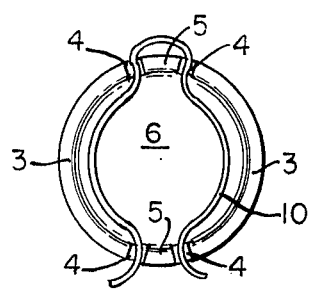
FIG. 3 shows a top view of the embodiment of the invention shown in FIG. 1, including a strip of abrasive sheet threaded around the inner diameter of bore 6.

In FIG. 3, a top view of this embodiment is shown in which a strip of abrasive sheet such as emery cloth or sandpaper has been threaded through retaining slots 4 among upstanding wall portions 3 and 5 to define an abrading surface on the interior diameter of bore 6. The inclusion of a relatively large number of retaining slots 4 insures that the strip of abrasive sheet will be properly retained in the device in use. The relative sizing of upstanding wall portions 3 and 5 is chosen to optimize the amount of abrasive sheet material exposed to the work piece along the inner diameters of upstanding wall portions 3 while simultaneously providing adequate frictional engagement between the abrasive strip and upstanding wall portions 5 to prevent unwanted movement of the abrasive strip in use.

In operation, the embodiment of FIGS. 1 through 3 is gently driven over the end of the work piece while rotating, so that the outer diameter of the work piece is exposed to the cleaning or size-reducing effects of the abrasive sheet 10. Bottom surface 7 limits the amount of insertion. The radiused lead-in surfaces 8 facilitate insertion of the work piece into bore 6 by providing a wedging effect which causes the upstanding wall portions 3 and 5 to deflect outwardly slightly as the work piece enters bore 6. The device may be manufactured of metal or a strong, resilient plastic material which will permit the upstanding wall portions to deflect somewhat from their normal position as the work piece enters bore 6 and then to return to their normal position as the cleaning or reaming operation is completed, thus ensuring concentric cleaning or size reduction. Although the bore 6 is shown as being an essentially right circular cylinder in shape, it will be obvious that the bore could also be tapered toward bottom surface 7 to provide a tapered configuration on the work piece, when desired. The flexibility of the wall portion also permits use of the tool to clean conical outside surfaces such as battery terminals, where no size reduction is desired.

Figure 4:
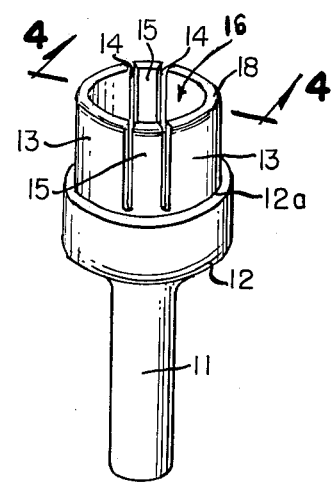
FIG. 4 shows a perspective view of another embodiment of the invention.

FIG. 4 shows a perspective view of a second embodiment of the invention. A shank 11 includes at one end an outwardly flaring body portion 12 which expands from a quarter-inch diameter at shank 11 to a diameter of approximately three-fourths of an inch in approximately one-half inch of axial distance along shank 11. Integrally attached to body portion 12 are upstanding, approximately semicircular wall portions 13 and arcuate wall portions 15 which are spaced from one another by radial, abrasive sheet retaining slots 14, thereby defining a central bore 16. The upstanding semicircular wall portions 13 extend through arcs of approximately 141.5° and are approximately ½ inch high. The arcuate wall portions 15 extend through arcs of approximately 25.6° or one-eighth inch as measured on an outside diameter and are also approximately ½ inch high. The retaining slots 14 extend through arcs of approximately 6.5° or one thirty-second inch at the outside diameter and are approximately ½ inch deep. The central bore 16 defined by wall portions 13 and 15 is approximately 0.4225 inches in diameter and ½ inch deep. Extending radially from the bases of the upstanding wall portions is a circumferential stop surface 12a. As before, these dimensions are only by way of example.

Figure 5:
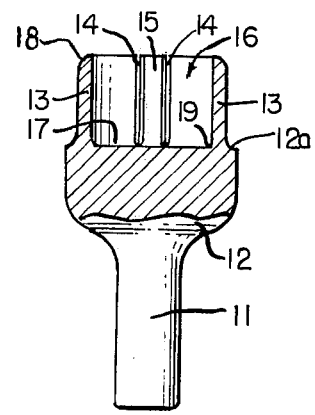
FIG. 5 shows a section taken along line 5—5 of FIG. 4.

Turning now to FIG. 5, the geometry of bore 16 may be understood. Bore 16 terminates in an essentially flat bottom surface 17 which is essentially coplanar with the bottoms of slots 14 and circumferential stop surface 12a. The lead-in edges 18 of the upstanding wall portions 13 and 15 are radiused as shown at numeral 18 to facilitate insertion of the device within a work piece bore to be cleaned or reamed. The intersection of bore 16 and bottom surface 17 is rounded as indicated at 19 in order to reduce stress concentrations in this location. Similarly, the intersection between the upstanding wall portions and the circumferential stop surface may be rounded to reduce stress concentration.

FIG. 3 shows a top view of this embodiment in which a strip of abrasive sheet such as emery cloth or sandpaper has been threaded among the upstanding wall portions as shown to define an essentially cylindrical abrasive surface located on the outer diameter of bore 16. The relative sizing of upstanding wall portions 13 and 15 and the number of retaining slots 14 are chosen for the reasons previously discussed with regard to FIGS. 1 through 3.

Figure 6:
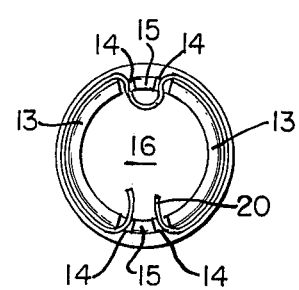
FIG. 6 shows a top view of the embodiment shown in FIG. 4 including a strip of abrasive sheet threaded around the outside diameter of bore 16.

In use, the embodiment shown in FIGS. 4 through 6 is gently inserted into a bore in a work piece while rotating. Circumferential stop surface 12a eventually abuts the exterior surface of the work piece to limit movement of the tool. Radiused lead-in edges 18 facilitate the insertion of the tool as previously discussed, by causing the upstanding wall portions 13 and 15 to flex slightly inwardly as the device enters the bore in the work piece. As the cleaning or reaming operation progresses, the upstanding wall portions return to their normal upright position as illustrated, thus ensuring a concentric cleaning or reaming. Although the outer walls of upstanding wall portions 13 and 15 are shown as being oriented vertically relative to circumferential stop surface 12a, it will be appreciated that these walls could be tapered outwardly from top to bottom in order to provide a conical cleaning or remaining in the work piece bore.

Having described my invention in such detail as to enable one of ordinary skill in the art to make and use it, I claim:

1. An abrading tool comprising:
   means adapted for receiving a rotating drive input;
   a body member attached to said drive receiving means, said body member having a surface oriented transverse to the axis of rotation of said drive receiving means;
   a plurality of wall portions upstanding from said transverse surface and defining a bore concentric with said axis of rotation of said drive receiving means, said wall portions being spaced one from the other around the bore; and
   at least one strip of abrasive sheet material threaded among said spaced wall portions around said bore, to define an essentially cylindrical abrading surface.

2. An abrading tool as in claim 1, wherein said abrading surface is located essentially exteriorly of said spaced wall portions.

3. An abrading tool as in claim 1, wherein said abrading surface is located essentially interiorly of said spaced wall portions.

4. An abrading tool as in claim 1, wherein said transverse surface is flat and said spaced upstanding wall portions define slots therebetween terminating at the transverse surface, said strip of abrasive material being threaded through said slots.

5. An abrading tool as in claim 1, wherein said upstanding wall portions are resilient and arcuately shaped.

6. An abrading tool as in claim 1, wherein said upstanding wall portions include radiused lead-in surfaces at their upper ends.

7. An abrading tool as in claim 2, further including a stop surface adjacent said upstanding wall portions, said wall portions being located between said stop surface and said bore.

* * * * *